US010403936B2

(12) United States Patent
Kobayashi et al.

(10) Patent No.: US 10,403,936 B2
(45) Date of Patent: Sep. 3, 2019

(54) STORAGE CELL CONTROL SYSTEM, STORAGE CELL CONTROL METHOD, AND RECORDING MEDIUM

(71) Applicant: NEC Corporation, Tokyo (JP)

(72) Inventors: Kenji Kobayashi, Tokyo (JP); Masato Yano, Tokyo (JP); Suguru Watanabe, Tokyo (JP); Hisato Sakuma, Tokyo (JP); Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 15/542,511

(22) PCT Filed: Jan. 15, 2016

(86) PCT No.: PCT/JP2016/000201
§ 371 (c)(1),
(2) Date: Jul. 10, 2017

(87) PCT Pub. No.: WO2016/114147
PCT Pub. Date: Jul. 21, 2016

(65) Prior Publication Data
US 2018/0269541 A1 Sep. 20, 2018

(30) Foreign Application Priority Data

Jan. 15, 2015 (JP) .................................. 2015-005741

(51) Int. Cl.
*H02J 7/00* (2006.01)
*H01M 10/44* (2006.01)
(Continued)

(52) U.S. Cl.
CPC ....... *H01M 10/441* (2013.01); *H01M 10/425* (2013.01); *H01M 10/482* (2013.01);
(Continued)

(58) Field of Classification Search
USPC .......................... 320/109, 110, 111, 112, 114
See application file for complete search history.

(56) References Cited

U.S. PATENT DOCUMENTS

| | | | | |
|---|---|---|---|---|
| 2005/0017686 A1* | 1/2005 | Sakakibara | ........ | G01R 31/3679 320/132 |
| 2010/0052617 A1* | 3/2010 | Aridome | ............... | B60L 3/0046 320/132 |

(Continued)

FOREIGN PATENT DOCUMENTS

| | | |
|---|---|---|
| EP | 2667479 A1 | 11/2013 |
| EP | 2966751 A1 | 1/2016 |

(Continued)

OTHER PUBLICATIONS

International Search Report corresponding to PCT/JP2016/000201, 4 pages, dated Apr. 19, 2016.

(Continued)

*Primary Examiner* — Brian Ngo
(74) *Attorney, Agent, or Firm* — Wilmer Cutler Pickering Hale and Dorr LLP

(57) ABSTRACT

A storage cell control system configured to perform charge/discharge control for a plurality of storage cells under control based on a power adjustment request from a power system includes: a power storage capacity calculating means configured to calculate a current power storage capacity of the storage cell based on storage cell information of the storage cell; a target power storage capacity setting means configured to set a target power storage capacity in stopping an operation of the storage cell; a capacity degradation speed calculating means configured to calculate a current capacity degradation speed and a target capacity degradation speed with respect to each power storage capacity by applying the current power storage capacity and the target power storage capacity to capacity degradation speed correlation informa- (Continued)

tion set in advance; and a power distributing means configured to distribute power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ is a time integral value of a capacity degradation speed in a case where the capacity degradation speed is fixed regardless of a power storage capacity, a capacity degradation amount minimization condition: a capacity degradation amount $D_{SOCvaried}(t) \leq$ a capacity degradation amount $D_{SOCfixed}(t)$ is satisfied.

16 Claims, 9 Drawing Sheets

(51) Int. Cl.
*H02J 3/32* (2006.01)
*H01M 10/42* (2006.01)
*H01M 10/48* (2006.01)
H01M 10/0525 (2010.01)

(52) U.S. Cl.
CPC .................. *H02J 3/32* (2013.01); *H02J 7/00* (2013.01); *H02J 7/007* (2013.01); *H02J 7/0021* (2013.01); *H01M 10/0525* (2013.01); *H01M 2010/4278* (2013.01); *H01M 2220/20* (2013.01)

(56) References Cited

U.S. PATENT DOCUMENTS

| | | | |
|---|---|---|---|
| 2012/0248876 A1* | 10/2012 | Tamura | G01R 31/3679 307/66 |
| 2013/0285613 A1 | 10/2013 | Fujita et al. | |
| 2014/0167706 A1* | 6/2014 | Sun | H02J 7/0081 320/160 |
| 2014/0253042 A1* | 9/2014 | Su | H02J 7/0031 320/134 |
| 2014/0320085 A1* | 10/2014 | Chang | H02J 7/0081 320/112 |
| 2015/0314700 A1* | 11/2015 | Ahn | H02J 7/0013 320/128 |
| 2016/0013670 A1 | 1/2016 | Tohara et al. | |
| 2016/0028254 A1* | 1/2016 | Honoki | H01M 10/44 320/162 |
| 2016/0105044 A1* | 4/2016 | Yamaguchi | H02J 7/0016 320/112 |

FOREIGN PATENT DOCUMENTS

| | | |
|---|---|---|
| JP | 2000-030751 A | 1/2000 |
| JP | 2001-307781 A | 11/2001 |
| JP | 2013-247726 A | 12/2013 |
| JP | 2014-171335 A | 9/2014 |
| JP | 5598553 B2 | 10/2014 |
| WO | WO-2012/111234 A1 | 8/2012 |

OTHER PUBLICATIONS

Written Opinion of International Search Authority with English translation corresponding to PCT/JP2016/000201, 7 pages, dated Apr. 19, 2016.

* cited by examiner

STORAGE CELL CONTROL SYSTEM, STORAGE CELL CONTROL METHOD, AND RECORDING MEDIUM

CROSS-REFERENCE TO RELATED APPLICATIONS

This application is a national stage application of International Application No. PCT/JP2016/000201 entitled "STORAGE CELL CONTROL SYSTEM, STORAGE CELL CONTROL METHOD, AND RECORDING MEDIUM," filed on Jan. 15, 2016, which claims the benefit of the priority of Japanese Patent Application No. JP2015-005741 filed on Jan. 15, 2015, the disclosures of each of which are hereby incorporated by reference in their entirety.

TECHNICAL FIELD

The present invention relates to a storage cell control system, a storage cell control method, and a recording medium.

BACKGROUND ART

In recent years, development of a technique of using a storage cell as a power source for electric vehicles, hybrid vehicles, or the like is carried out. Further, there is also carried out development of a technique of using such a storage cell as a distributed power source for power adjustment, as exemplified by a solar battery, wind power generation, or the like, in which the storage cell is incorporated in a power system.

Regarding a power source for power adjustment, durability of ten years or longer is required, and reduction of the production cost and the maintenance cost is required. It is important to extend the product lifetime in order to meet these requirements.

A best method for extending the product lifetime is optimization of a material or a structure of a battery cell constituting a storage cell. However, development of this technique requires a large amount of time and money. In view of the above, it is important to carry out development of a technique of suppressing lifetime degradation of a storage cell concurrently or prior to development of a technique of extending the product lifetime.

Note that lifetime degradation is associated with degradation of performance of supplying the amount of power storable by a storage cell or stored power. In view of the above, in the following description, degradation of lifetime of the product is described as capacity degradation as necessary.

Capacity degradation of a storage cell greatly differs depending on an operation method or the like. In view of the above, for instance, PTL 1 or PTL 2 proposes a technique of suppressing capacity degradation by improving a charge/discharge method with respect to a lithium ion secondary battery.

Specifically, in PTL 1, charge/discharge of a lithium ion secondary battery is controlled in such a manner that the amount of lithium ions migrating between a cathode active material and an anode active material is equal to or less than 95% of the amount of reversibly movable lithium ions.

Further, in PTL 2, charge/discharge of a lithium ion secondary battery is controlled in such a manner that the end-of-discharge voltage during discharge is set to 3.2 to 3.1 V, and the upper limit voltage of a cell during charge is set to 4.0 to 4.5 V.

CITATION LIST

Patent Literature

[PTL 1] Japanese Laid-open Patent Publication No. 2000-030751
[PTL 2] Japanese Laid-open Patent Publication No. 2001-307781

SUMMARY OF INVENTION

Technical Problem

As described above, it is necessary to satisfy a power adjustment request while suppressing capacity degradation of a storage cell in order to spread the storage cell as a power source for power adjustment. However, in the various techniques of suppressing capacity degradation, which have been proposed in the past including the aforementioned PTLs, it is difficult to satisfy a request relating to the product lifetime of 10 years or longer, which is required for a power source for power adjustment.

In view of the above, a main object of the present invention is to provide a storage cell control system, a storage cell control method, and a recording medium, which enable to efficiently suppress capacity degradation of a storage cell.

Solution to Problem

In order to solve the aforementioned inconveniences, an invention directed to a storage cell control system configured to perform charge/discharge control for a plurality of storage cells under control based on a power adjustment request from a power system includes: a power storage capacity calculating means configured to calculate a current power storage capacity of the storage cell based on storage cell information of the storage cell; a target power storage capacity setting means configured to set a target power storage capacity in stopping an operation of the storage cell; a capacity degradation speed calculating means configured to calculate a current capacity degradation speed and a target capacity degradation speed with respect to each power storage capacity by applying the current power storage capacity and the target power storage capacity to capacity degradation speed correlation information set in advance; and a power distributing means configured to distribute power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ a time integral value of a capacity degradation speed in a case where the capacity degradation speed is fixed regardless of a power storage capacity, a capacity degradation amount minimization condition: a capacity degradation amount $D_{SOCvaried}(t) \le$ a capacity degradation amount $D_{SOCfixed}(t)$ is satisfied.

Further, an invention directed to a storage cell control method for performing charge/discharge control for a plurality of storage cells under control based on a power adjustment request from a power system includes: calculating a current power storage capacity of the storage cell based on storage cell information of the storage cell; setting a target power storage capacity in stopping an operation of the storage cell; calculating a current capacity degradation speed and a target capacity degradation speed with respect to each power storage capacity by applying the current power storage capacity and the target power storage capacity to capacity degradation speed correlation information set in advance; and distributing power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ is a time integral value of a capacity degradation speed in a case where the capacity degradation speed is fixed regardless of a power storage capacity, a capacity degradation amount minimization condition: a capacity degradation amount $D_{SOCvaried}(t) \leq$ a capacity degradation amount $D_{SOCfixed}(t)$ is satisfied.

Further, an invention directed to a recording medium storing a storage cell control program which causes a computer to execute charge/discharge control for a plurality of storage cells under control based on a power adjustment request from a power system is that the storage cell control program includes: a step of calculating a current power storage capacity of the storage cell based on storage cell information of the storage cell; a step of setting a target power storage capacity in stopping an operation of the storage cell; a step of calculating a current capacity degradation speed and a target capacity degradation speed with respect to each power storage capacity by applying the current power storage capacity and the target power storage capacity to capacity degradation speed correlation information set in advance; and a step of distributing power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ is a time integral value of a capacity degradation speed in a case where the capacity degradation speed is fixed regardless of a power storage capacity, a capacity degradation amount minimization condition: a capacity degradation amount $D_{SOCvaried}(t) \leq$ a capacity degradation amount $D_{SOCfixed}(t)$ is satisfied.

Advantageous Effects of Invention

According to the present invention, it is possible to operate a storage cell according to a power adjustment request, while suppressing capacity degradation of the storage cell.

DESCRIPTION OF EMBODIMENTS

First Exemplary Embodiment

The first exemplary embodiment is described. A storage cell control system according to the exemplary embodiment performs charge/discharge control for a plurality of storage cells under control based on a power adjustment request from a power system. In this example, the storage cell control system includes a power storage capacity calculator, a target power storage capacity setter, a capacity degradation speed calculator, and a power distributor. The power storage capacity calculator calculates a current power storage capacity of a storage cell based on storage cell information of the storage cell. The target power storage capacity setter applies a current power storage capacity and a target power storage capacity to capacity degradation speed correlation information, which is set in advance, and is used to set a target power storage capacity in stopping an operation of a storage cell. Further, a current capacity degradation speed and a target capacity degradation speed with respect to each power storage capacity are calculated. The power distributor distributes power to a plurality of storage cells in such a manner that a capacity degradation amount minimization condition: a capacity degradation amount $D_{SOCvaried}(t) \leq$ a capacity degradation amount $D_{SOCfixed}(t)$ is satisfied. In this example, t is an elapsed time from start of operation. The capacity degradation amount $D_{SOCvaried}(t)$ is a time integral value of a capacity degradation speed in a case where the capacity degradation speed varies according to a power storage capacity. The capacity degradation amount $D_{SOCfixed}(t)$ is a time integral value of a capacity degradation speed in a case where the capacity degradation speed is fixed regardless of a power storage capacity.

According to the aforementioned configuration, it is possible to operate a storage cell according to a power adjustment request while suppressing capacity degradation of the storage cell.

Second Exemplary Embodiment

Next, prior to description of the second exemplary embodiment, principles of the present invention are briefly described. The inventors of the present application found that it is possible to estimate a capacity degradation amount of a power storage capacity by applying a current power storage capacity to capacity degradation speed correlation information.

Figure 1:
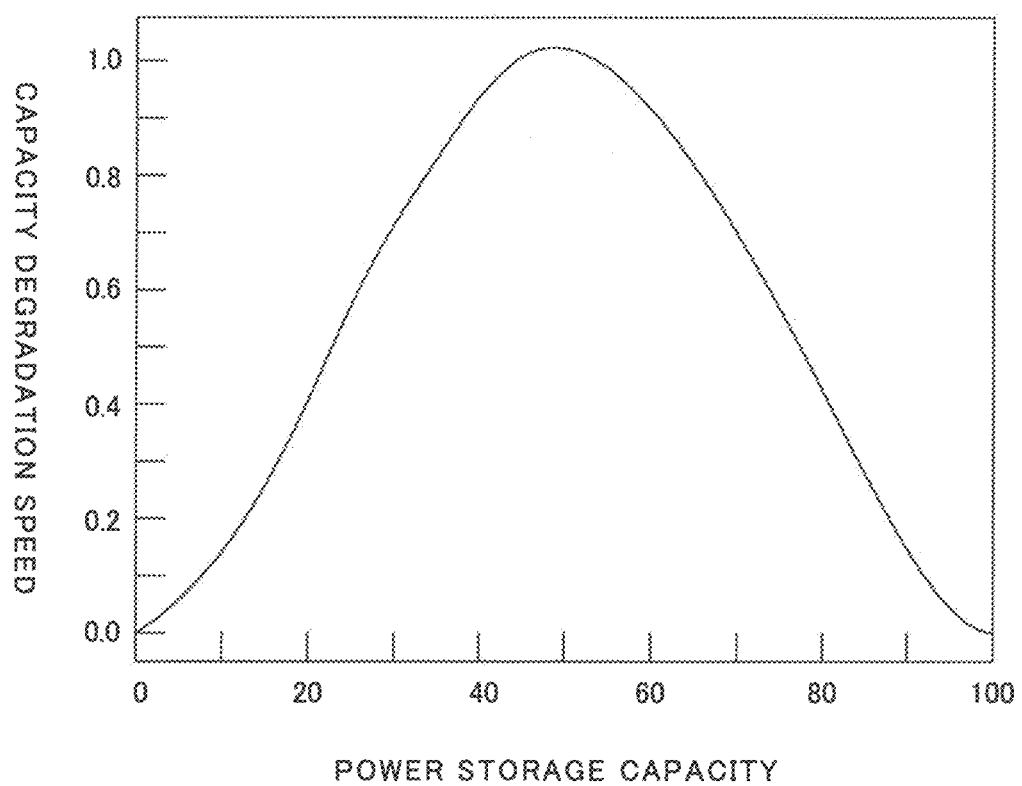
FIG. 1 is a diagram exemplifying capacity degradation speed correlation information to be applied to description on principles of the present invention.

Note that capacity degradation speed correlation information is information obtained by expressing a correlation between a power storage capacity and a capacity degradation speed in the form of a table or the like. FIG. 1 is a diagram illustrating an example of capacity degradation speed correlation information. Note that directions of arrows in the drawings to be referred to in the following exemplary embodiments illustrate an example, and do not limit directions of signals between blocks. A capacity degradation speed is uniquely determined when a power storage capacity is given. On the other hand, a power storage capacity is not uniquely determined even when a capacity degradation speed is given.

A capacity degradation speed function v is defined by the formula (1), in which SOC denotes a battery capacity, and t denotes an arbitrary time.

$$v = f(t, SOC) \quad (1)$$

Note that the function f is a function, in which a battery capacity SOC and a time t are power variables. It is possible to determine coefficients of the function f in such a manner that a capacity degradation speed obtained by conducting an experiment in advance is reproducible. Note that in the exemplary embodiment, a specific expression of the function f is not required.

When the aforementioned capacity degradation speed function v is used, a capacity degradation amount D(t) of a storage cell at an arbitrary point of time t is given by the formula (2).

$$D(t) = \int_{t_0}^{t} f(t, SOC) dt \quad (2)$$

In this example, $t_0$ is a point of time when an operation is started (a point of time when a storage cell starts charge/discharge).

It is assumed that an operation is stopped when a power storage capacity of a storage cell reaches a target power storage capacity. In this example, it is assumed that a condition expressed by the formula (3) is established between a capacity degradation speed at a power storage capacity when an operation is started, and a capacity degradation speed when the power storage capacity reaches a target power storage capacity.

$$f(t, SOC_t) < f_0(t, SOC_{t0}) \quad (3)$$

In this example, t is an elapsed time from start of operation, $SOC_{t0}$ is a power storage capacity when an operation is started, and $SOC_t$ is a power storage capacity at a point of time t. Further, $f_0$ is a function f, in which a battery capacity SOC and a time to are power variables. An operation that establishes the formula (3) is an operation, in which a capacity degradation speed when a power storage capacity reaches a target power storage capacity is smaller than a capacity degradation speed when an operation is started. In a case where there are a plurality of storage cells, only a storage cell that satisfies the formula (3) is used. Specifically, in the exemplary embodiment, only a storage cell that satisfies the formula (3) is selected and used for power adjustment. In the following, the formula (3) is described as a control target selection condition.

Next, it is assumed that a time integral value of a capacity degradation speed in a case where the capacity degradation speed varies according to a power storage capacity is a capacity degradation amount $D_{SOCvaried}(t)$, and a time integral value of a capacity degradation speed in a case where the capacity degradation speed is fixed regardless of a power storage capacity is a capacity degradation amount $D_{SOCfixed}(t)$.

In this case, when power is allocated (distributed) with respect to each storage cell in such a manner that the capacity degradation amount $D_{SOCvaried}(t)$ is smaller than the capacity degradation amount $D_{SOCfixed}(t)$ according to the formula (4), it is possible to minimize the capacity degradation amount. In the following, the formula (4) is described as a capacity degradation amount minimization condition.

$$D_{SOCvaried}(t) \leq D_{SOCfixed}(t) \quad (4)$$

Note that as will be described later, it is possible to set a plurality of target power storage capacities with respect to requested power adjustment.

Specifically, in performing power distribution with respect to each storage cell, a weighting factor $a_k$ to be defined by the formula (5) is used, and the weighting factor $a_k$ is determined to satisfy the formula (6) and the formula (7).

$$a_k = g_k(v_k, SOC_k) \quad (5)$$

$$P_k = \frac{a_k}{\sum a_k} P_t \quad (6)$$

$$\sum P_k = P_t \quad (7)$$

Note that the formula (6) standardizes each weighting factor $a_k$ by a sum of all of the weighting factors $a_k$. Further, the formula (7) is a restraint condition of the formula (6). In this example, k is a number to be given to a storage cell whose operation is controlled, and g is a weighting function. In the exemplary embodiment, a storage cell that satisfies a degradation minimization condition is controlled. A weighting function is a function, in which a power storage capacity, and a capacity degradation speed at the power storage capacity are variables. For instance, it is possible to exemplify a function or the like, which is inversely proportional to a capacity degradation speed, and is proportional to a power storage capacity.

Note that the exemplary embodiment is applicable to a storage cell whose capacity degradation speed correlation information can be known, regardless of an inner structure of the storage cell. In particular, the exemplary embodiment is suitable for control of a lithium ion battery, whose capacity degradation speed greatly depends on a current power storage capacity.

Figure 2:
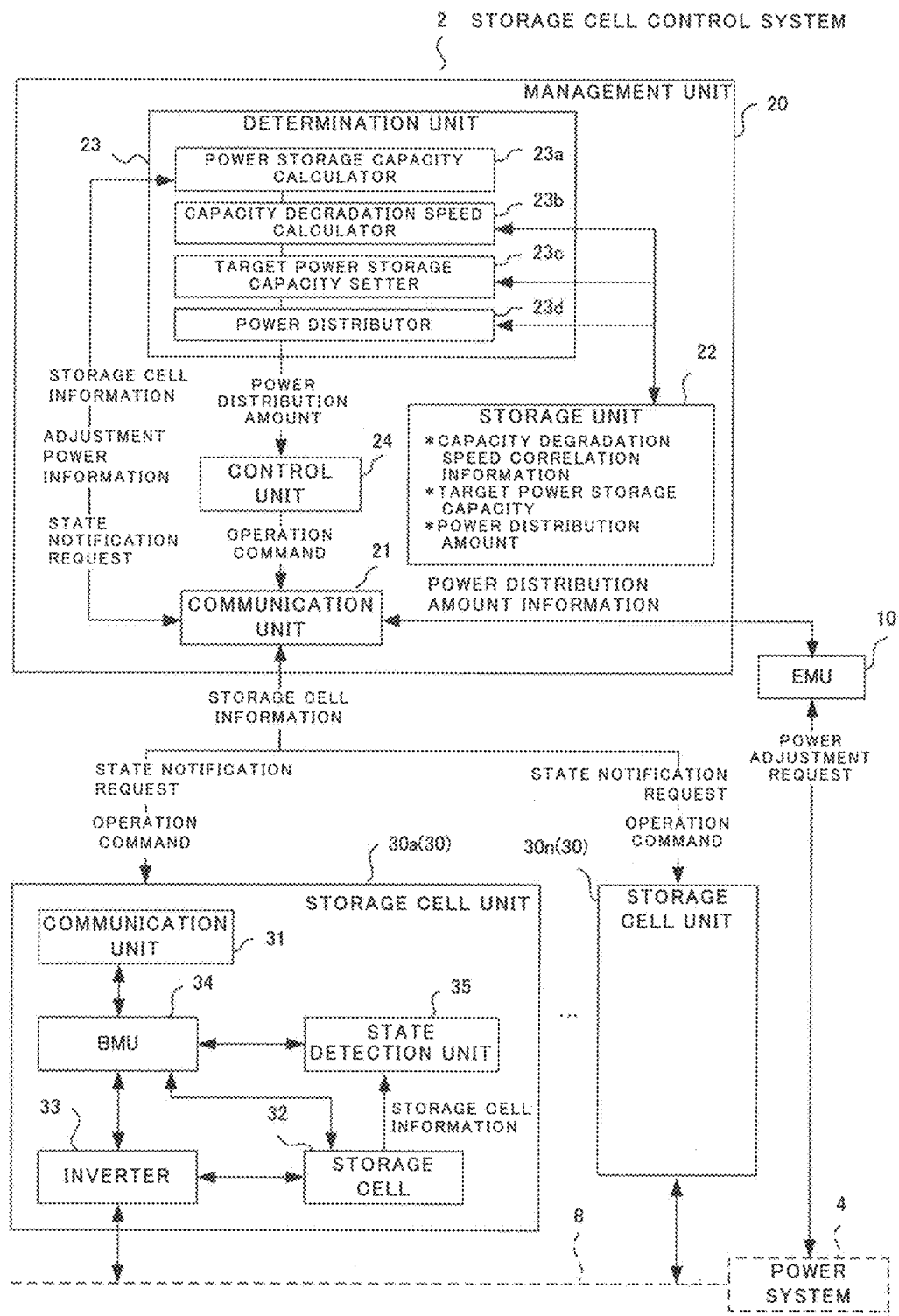
FIG. 2 is a block diagram of a storage cell control system to be applied to description of a second exemplary embodiment.

Next, a storage cell control system 2 based on principles of the present invention described above is described. FIG. 2 is a block diagram of the storage cell control system 2. The storage cell control system 2 is constituted by an EMU (Energy Management Unit) 10, a management unit 20, and a plurality of storage cell units 30 (30a to 30n; n is a positive integer of 2 or larger) as primary components.

Note that in FIG. 2, a power system 4 is also illustrated. These elements, however, are not essential constituent elements in the exemplary embodiment. The power system 4 is a system for supplying power to a power consumer. The power system 4 includes, for instance, a power plant such as a thermal power plant, a renewable power source, a transformer, and a power line 8. In this case, the power system 4 supplies generated power from a power plant or a renewable power source via a transformer and the power line 8.

The storage cell unit 30 includes a communication unit 31, a storage cell 32, an inverter 33, a BMU (Battery Management Unit) 34, and a state detection unit 35. Further, the storage cell unit 30 performs power adjustment with respect to the power system 4 in a case where power adjustment balance is broken in the power system 4.

Note that management of the storage cell unit 30 may be performed by one of a power consumer and a power supplier. Further, a plurality of storage cell units 30 may be disposed in a concentrated manner or in a distributed manner, as far as the storage cell units 30 are under the control of the management unit 20.

The communication unit 31 mutually communicates with the management unit 20.

The storage cell 32 includes at least one or more storage cells 32. For instance, the storage cell 32 may be a storage cell for stationary placement, or a secondary battery to be mounted in an electric vehicle. Further, it is also possible to use a lithium ion secondary battery.

The inverter 33 converts an alternate-current voltage from the power line 8 to a direct-current voltage in charging the storage cell 32, and converts a direct-current voltage from the storage cell 32 to an alternate-current voltage in discharging the storage cell 32.

The BMU 34 charges or discharges (operates) the storage cell 32 by controlling the inverter 33 according to an operation command from the management unit 20.

The state detection unit 35 detects battery characteristics of the storage cell 32 (a temperature or a terminal voltage of the storage cell 32) as storage cell information. Storage cell information is transmitted to the management unit 20 via the BMU 34 and the communication unit 31.

Note that storage cell information is not limited to a temperature or a terminal voltage of the storage cell 32, but may include other characteristics such as an ambient temperature of the storage cell 32. Further, storage cell information may be periodically detected, or may be detected only when a request is received from the management unit 20.

The energy management unit 10 communicates with the power system 4 and a communication unit 21. Further, in response to receiving a power adjustment request from the power system 4, the energy management unit 10 calculates a required adjustment power amount $P_t$, and outputs the calculated required adjustment power amount $P_t$ to the communication unit 21.

The energy management unit 10 calculates in advance and holds a predicted total demand curve indicating a predicted power demand, or holds a predicted total demand curve provided from an external organization. In view of the above, when there is an area (hereinafter, referred to as a "peak cut target area"), which exceeds a predetermined reference value (which is set in advance) on a predicted total demand curve, the energy management unit 10 calculates power associated with the peak cut target area, as the adjustment power amount $P_t$.

Specifically, a predicted total demand curve is a curve indicating predicted amount of power to be requested from a power consumer. Further, a reference value is a value indicating an amount of power, which represents power supply performance of the power system 4. In view of the above, the energy management unit 10 determines that power exceeding power supply performance is requested (power shortage) with respect to power exceeding a reference value (power associated with a peak cut target area), and requests the storage cell 32 to supply a deficiency of power. Conversely, when power is lower than the reference value, the energy management unit 10 determines that there is power supply surplus, and requests allocation of the surplus power for charging the storage cell 32. The amount of power shortage or the amount of power surplus is calculated as the adjustment power amount $P_t$, and whether or not the power amount is the amount of power shortage or the amount of power surplus is indicated by the sign (a plus sign or a minus sign) of the adjustment power amount $P_t$.

In the following description, it is assumed that in a case where the power system 4 is in a power shortage state, the adjustment power amount $P_t$ has a positive value, and in a case where the power system 4 is in a power surplus state, the adjustment power amount $P_t$ has a negative value. Specifically, in a case where the adjustment power amount $P_t$ has a positive value ($P_t>0$), the storage cell 32 is discharged, and in a case where the adjustment power amount $P_t$ has a negative value ($P_t<0$), the storage cell 32 is charged.

A process of calculating the adjustment power amount $P_t$ as described above is performed every predetermined time interval $\Delta t$, and the adjustment power amount $P_t$ is transmitted to the management unit 20 as adjustment power information.

The management unit 20 includes the communication unit 21, a storage unit 22, a determination unit 23, and a control unit 24. The management unit 20 controls the storage cell unit 30 based on adjustment power information from the energy management unit 10.

The storage unit 22 stores capacity degradation speed correlation information indicating a correlation between a power storage capacity and a capacity degradation speed of the storage cell 32, a target power storage capacity being a power storage capacity in stopping charge/discharge, and power (a power distribution amount) allocated to each storage cell unit 30 with respect to the adjustment power amount $P_t$. Note that capacity degradation speed correlation information may be any of capacity degradation speed correlation information based on actual measurement, capacity degradation speed correlation information derived by calculation, and capacity degradation speed correlation information determined by another method.

In response to receiving adjustment power information from the EMU 10, the determination unit 23 transmits, via the communication unit 21, a request (a state notification request) indicating notification of a current state to each storage cell unit 30. In response to the state notification request, each storage cell unit 30 detects storage cell information (including a case where storage cell information is already detected), and transmits the detected storage cell information to the determination unit 23.

Then, the determination unit 23 determines a power distribution amount based on storage cell information and adjustment power information, and outputs the determined power distribution amount to the control unit 24 as power distribution amount information. The determination unit 23 is constituted by a power storage capacity calculator 23a, a capacity degradation speed calculator 23b, a target power storage capacity setter 23c, and a power distributor 23d.

The power storage capacity calculator 23a calculates a current power storage capacity of the storage cell 32 based on storage cell information. The capacity degradation speed calculator 23b applies a power storage capacity to capacity degradation speed correlation information, and calculates a capacity degradation speed.

The target power storage capacity setter 23c sets a target power storage capacity in stopping charge/discharge of the storage cell 32. The power distributor 23d selects whether or not a plurality of storage cells 32 are units to be controlled as a power source for power adjustment, sets the priority order indicating the order of operation with respect to storage cells selected as units to be controlled, and distributes power to each storage cell 32.

The control unit 24 generates a command (an operation command) with respect to each storage cell unit 30 based on power distribution amount information, and outputs the generated command via the communication unit 21.

Note that the management unit 20 may be constituted by a computer. In this case, a computer is operable to read and execute a program recorded in a recording medium such as a computer-readable CD-ROM (Compact Disc Read Only Memory).

Figure 3:
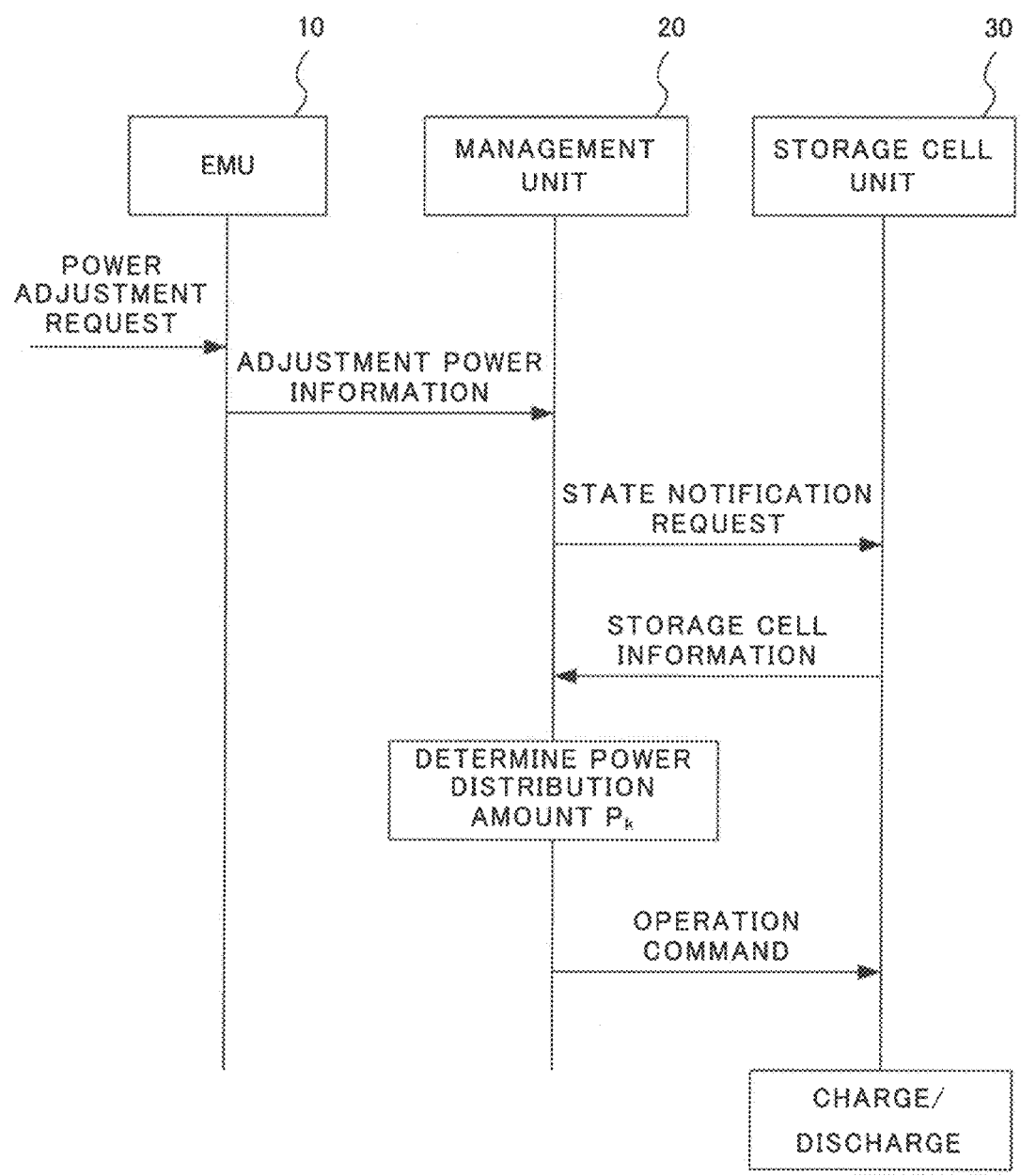
FIG. 3 is a sequence illustrating a charge/discharge operation of a storage cell system.

Next, an operation of the storage cell control system 2 is described. FIG. 3 is a diagram illustrating a sequence of the storage cell control system 2.

After calculating the adjustment power amount $P_t$ based on a power adjustment request, the energy management unit 10 transmits the calculated adjustment power amount $P_t$ to the determination unit 23 of the management unit 20 as adjustment power information.

In response to receiving adjustment power information, the determination unit 23 transmits a state notification request to each storage cell unit 30 via the communication unit 21.

In response to receiving state notification request, the BMU 34 of each storage cell unit 30 acquires storage cell information from the state detection unit 35, and outputs the acquired storage cell information to the determination unit 23.

In response to receiving storage cell information, the determination unit 23 determines a power distribution amount $P_k$ with respect to each storage cell unit 30, and outputs the determined power distribution amount $P_k$ to the control unit 24 as power distribution amount information.

The control unit 24 generates an operation command from power distribution amount information, and outputs the generated operation command to the BMU 34 of each storage cell unit 30. The BMU 34 performs charge/discharge of the storage cell 32 by controlling the inverter 33 based on received operation command. In this example, in a case where the power distribution amount $P_k$ included in an operation command has a positive value ($P_k>0$), the storage cell 32 is discharged, and in a case where the power distribution amount $P_k$ has a negative value ($P_k<0$), the storage cell 32 is charged.

Figure 4:
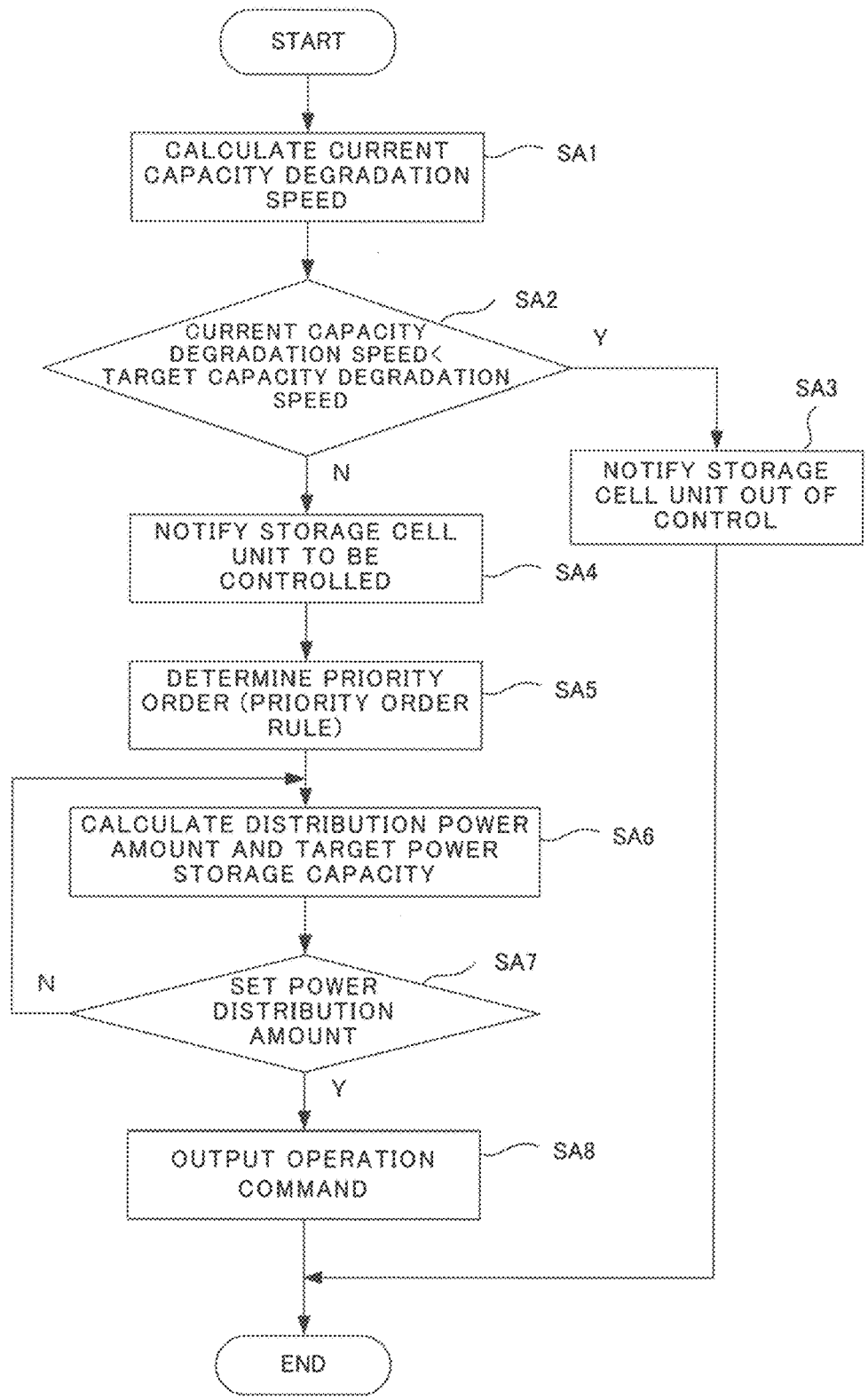
FIG. 4 is a flowchart illustrating a process of determining a power distribution amount.

Next, a process of determining a power distribution amount with respect to the storage cell unit 30 by the determination unit 23 is described. FIG. 4 is a flowchart illustrating the process of determining a power distribution amount.

Step SA1: The power storage capacity calculator 23*a* of the determination unit 23 calculates a power storage capacity at a current time (hereinafter, described as a current power storage capacity) from storage cell information detected by the state detection unit 35. The current power storage capacity is calculated with respect to all the storage cells 32.

Note that a power storage capacity stored in the storage cell 32 is calculated from a terminal voltage. However, a power storage capacity calculated from a terminal voltage is affected by a temperature of the storage cell 32. Therefore, calculated power storage capacity may be deviated from an accurate value. In view of the above, the power storage capacity calculator 23*a* corrects a terminal voltage with use of a temperature of the storage cell 32 included in storage cell information. Further, the power storage capacity calculator 23*a* calculates a current power storage capacity with use of a corrected terminal voltage. Therefore, it is possible to calculate an accurate current power storage capacity.

The target power storage capacity setter 23*c* reads, from the storage unit 22, a target power storage capacity set with respect to each storage cell 32.

The capacity degradation speed calculator 23*b* calculates a capacity degradation speed with respect to a current power storage capacity and a target power storage capacity, based on capacity degradation speed correlation information stored in the storage unit 22. Further, the capacity degradation speed calculator 23*b* sets a capacity degradation speed at a current power storage capacity as a current capacity degradation speed, and sets a capacity degradation speed at a target power storage capacity as a target capacity degradation speed.

Figure 5:
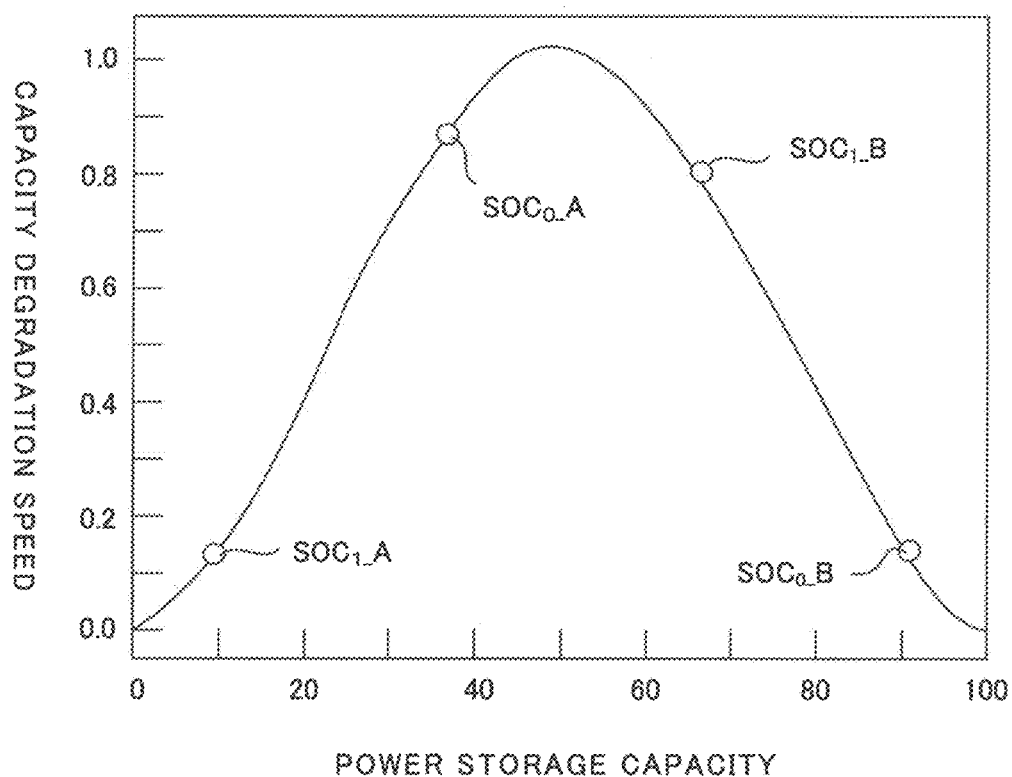
FIG. 5 is a diagram exemplifying a capacity degradation speed in a case where predetermined power is discharged from a current power storage capacity.

Step SA2 to Step SA4: When the storage cell 32 is operated, there is a case that a capacity degradation speed increases depending on a current power storage capacity, and there is a case that a capacity degradation speed decreases depending on a current power storage capacity. FIG. 5 is a diagram exemplifying a capacity degradation speed in a case where predetermined power is discharged from a current power storage capacity.

There are assumed two storage cells A and B, whose current power storage capacities are $SOC_0\_A$ and $SOC_0\_B$. In this case, the power storage capacity of the storage cell A changes from the current power storage capacity $SCO_0\_A$ to a target power storage capacity $SOC_1\_A$. A change in the capacity degradation speed in this case satisfies the control target selection condition defined by the formula (3), and the capacity degradation amount minimization condition defined by the formula (4).

On the other hand, the power storage capacity of the storage cell B changes from the current power storage capacity $SOC_0\_B$ to a target power storage capacity $SOC_1\_B$. In this case, a capacity degradation speed decreases. Therefore, a change in the power storage capacity in this case does not satisfy the control target selection condition defined by the formula (3). Accordingly, the change also does not satisfy the capacity degradation amount minimization condition defined by the formula (4).

In view of the above, the power distributor 23*d* compares between a current capacity degradation speed $v(SOC_0)$ and a target capacity degradation speed $v(SOC_1)$ with respect to each storage cell 32. In this example, in a case where the target capacity degradation speed $v(SOC_1)$ is smaller than the current capacity degradation speed $v(SOC_0)$ [$v(SCO_0) \geq v(SOC_1)$], the storage cell unit 30 is selected as a unit to be controlled. In other words, in a case where the target capacity degradation speed $v(SOC_1)$ is larger than the current capacity degradation speed $v(SOC_0)$ [$v(SCO_0) < v(SOC_1)$], the storage cell unit 30 is eliminated from units to be controlled. Notification as to whether a storage cell unit is selected as a unit to be controlled is performed with respect to each storage cell unit 30.

Note that there is a case where it may be impossible to satisfy the required adjustment power amount $P_t$ only by a storage cell unit 30 to be controlled. In this case, a storage cell unit whose capacity degradation speed is small may be restored as a unit to be controlled, out of the storage cell units 30 that are eliminated from units to be controlled.

Step SA5: When a unit to be controlled is selected as described above, the power distributor 23*d* sets the priority order of control with respect to the storage cell unit 30 selected as a unit to be controlled.

The priority order is set in such a manner that the capacity degradation amount minimization condition defined by the formula (4) is satisfied to minimize the capacity degradation amount, and the priority increases in the ascending order of a target capacity degradation speed.

Further, as another method for determining the priority order, power may be distributed in such a manner that the incentive for power adjustment is minimized. From a viewpoint of an operator of the power system 4, it is possible to minimize the operating cost by setting the priority order from a storage cell control system 2, whose cost for the incentive is low. Further, it is possible to predict, as a principle, a difference in cost between value loss of the storage cell 32 by capacity degradation, and an incentive. Therefore, in a case where the number of units to be controlled is insufficient, it is possible to encourage an owner of the storage cell control system 2 to participate in power adjustment by increasing the incentive.

Step SA6 to Step SA7: The power distributor 23d sets a power distribution amount with respect to the storage cell unit 30 in such a manner that a required power amount (the adjustment power amount $P_t$) is attained. In a case where setting is performed, the process is returned to Step SA6 so as to set a power distribution amount with respect to a next storage cell unit 30. Note that a determined power distribution amount is output to the control unit 24 as power distribution amount information.

Step SA8: The control unit 24 outputs power distribution amount information to each storage cell unit 30 as an operation command. Therefore, each storage cell unit 30 is operated according to an operation command.

As described above, it is possible to suppress capacity degradation of the storage cell 32 while satisfying a power adjustment request. Therefore, it is possible to satisfy a request relating to the product lifetime of the storage cell 32, and to use the storage cell 32 as a distributed power source for power adjustment.

Further, the aforementioned storage cell control method is applicable to a request from a power system for each single operation of charge/discharge. Therefore, a great advantageous effect is obtained in suppressing voltage fluctuation or in controlling reactive power in a power system, for instance.

Third Exemplary Embodiment

Figure 6:
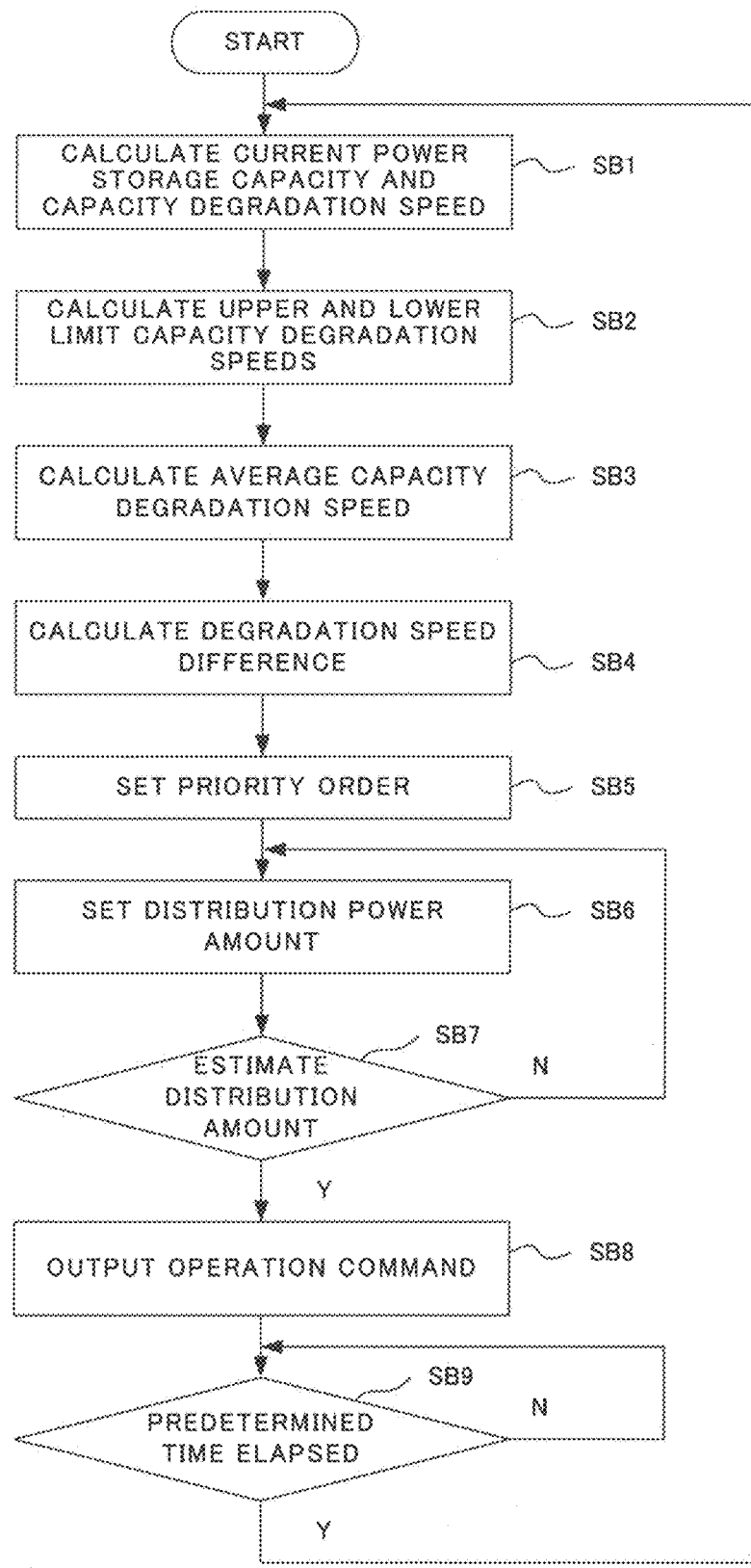
FIG. 6 is a flowchart illustrating a process of determining a power distribution amount to be applied to description of a third exemplary embodiment.

Next, the third exemplary embodiment is described. Note that the same constituent elements as those in the second exemplary embodiment are indicated with the same reference numerals, and description thereof is omitted as necessary. The exemplary embodiment relates to a storage cell control method in a case where power adjustment is performed at a relatively short and fixed cycle (a charge/discharge cycle). FIG. 6 is a flowchart illustrating a process of determining a power distribution amount.

Step SB1: First of all, a power storage capacity calculator 23a of a determination unit 23 requests a storage cell unit 30 under control for storage cell information, and calculates a current power storage capacity based on the storage cell information.

Further, a capacity degradation speed calculator 23b obtains a current capacity degradation speed with respect to a current power storage capacity by applying a calculated current power storage capacity to capacity degradation speed correlation information.

Step SB2 to Step SB4: Next, a target power storage capacity setter 23c sets an upper limit power storage capacity and a lower limit power storage capacity in a case where a storage cell is operated at a requested cycle (a charge/discharge cycle) as an upper limit target power storage capacity and a lower limit target power storage capacity. In a case where a storage cell 32 is cyclically operated in a fixed power range, a power storage capacity changes in a fixed range. In this case, a power storage capacity at a fully charged state is an upper limit target power storage capacity, and a power storage capacity at a fully discharged state is a lower limit target power storage capacity.

Further, the capacity degradation speed calculator 23b calculates an upper limit capacity degradation speed associated with an upper limit target power storage capacity, and a lower limit capacity degradation speed associated with a lower limit target power storage capacity, calculates an average value (an average capacity degradation speed), and then, calculates a degradation speed difference.

Upper limit and lower limit capacity degradation speeds are calculated by applying upper limit and lower limit target power storage capacities to capacity degradation speed correlation information.

An average capacity degradation speed $v_{average}$ is defined by the formula (8) when it is assumed that $x_i$ is a center value (an intermediate value) between an upper limit capacity degradation speed and a lower limit capacity degradation speed, and $\Delta x$ is a fluctuation width of power storage capacity.

$$v_{average}(\Delta x) = \frac{\int_{x_1-\Delta x}^{x_1+\Delta x} v(x)dx}{2\Delta x} \quad (8)$$

A degradation speed difference is a difference between a capacity degradation speed at a current power storage capacity, and an average capacity degradation speed. The degradation speed difference is defined by the formula (9).

$$\frac{\partial v_{average}}{\partial \Delta x} = \frac{(v(x_1+\Delta x)+v(x_1-\Delta x))\Delta x - \int_{x_1-\Delta x}^{x_1+\Delta x} v(x)dx}{2(\Delta x)^2} \quad (9)$$

In this example, a derivative function is equal to positive or negative in the formula (10).

$$\frac{(v(x_1+\Delta x)+v(x_1-\Delta x))}{2} 2\Delta x - \int_{x_1-\Delta x}^{x_1+\Delta x} v(x)dx \quad (10)$$

Specifically, comparison may be made between a trapezoidal area defined by four points $(x_1-\Delta x, 0)$, $(x_1-\Delta x, v(x_1-\Delta x))$, $(x_1+\Delta x, 0)$, $(x_1+\Delta x, v(x_1+\Delta x))$, and an area of a portion surrounded by the x-axis, $x=x_1-\Delta x$, $x=x_1+\Delta x$, $v(x)$. Specifically, the function can be classified into the following three patterns:

(1) A case where power storage capacity dependency of capacity degradation is symmetrical with respect to a center value of a cyclic operation of charge/discharge In this case, a derivative function of the average capacity degradation speed $v_{average}$ is 0, and a fixed value $V(x_1)$ is obtained.

(2) A case where power storage capacity dependency of capacity degradation is downwardly convex In this case, a derivative function of the average capacity degradation speed $v_{average}$ is positive. Therefore, the average capacity degradation speed $v_{average}$ monotonously increases, and a capacity degradation amount increases as a fluctuation width of power storage capacity increases.

(3) A case where power storage capacity dependency of capacity degradation is upwardly convex In this case, a derivative function of the average capacity degradation speed $v_{average}$ is negative. Therefore, the average capacity degradation speed $v_{average}$ monotonously decreases, and a capacity degradation amount decreases as a fluctuation width of power storage capacity increases.

Figure 7A:
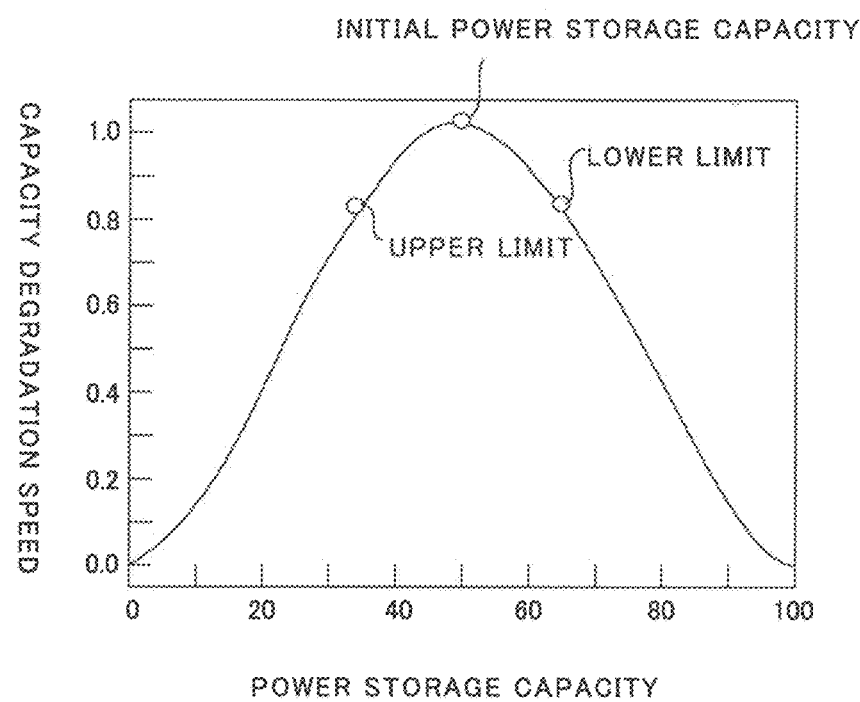
FIG. 7A is a diagram in a case where a degradation speed difference indicating capacity degradation speed correlation information of two storage cell units whose current power storage capacities are different from each other is small.
Figure 7B:
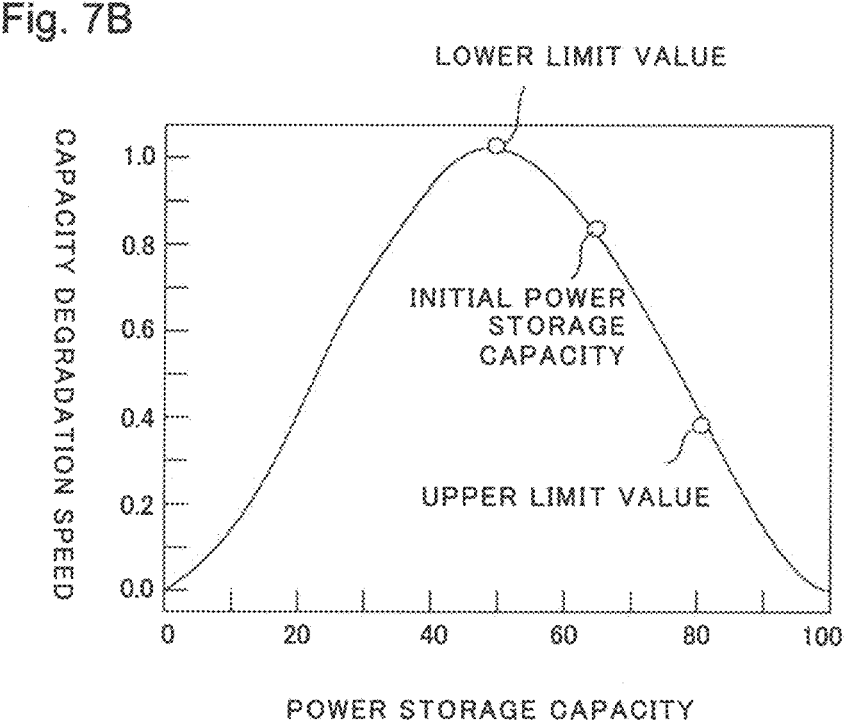
FIG. 7B is a diagram in a case where a degradation speed difference indicating capacity degradation speed correlation information of two storage cell units whose current power storage capacities are different from each other is large.

FIG. 7A and FIG. 7B are diagrams illustrating capacity degradation speed correlation information of two storage cell units 30, whose current power storage capacities are different from each other. FIG. 7A is a diagram illustrating a case where a degradation speed difference is small, and FIG. 7B is a diagram illustrating a case where a degradation speed difference is large. A degradation speed difference of the storage cell unit 30 illustrated in FIG. 7B is large. Therefore, power is preferentially distributed from the storage cell unit 30. This makes it possible to reduce the capacity degradation amount in operation, as compared with a case where power is equally distributed.

Step SB5 to Step SB7: Further, a power distributor 23d sets the high priority order from a storage cell, whose degradation speed difference is largest, and sets a power distribution amount in Step SB6. In this case, a set value with respect to each storage cell is unfixed. Therefore, in Step SB7, a power distribution amount is estimated in such a manner that the total amount of target power storage capacities coincides with an adjustment power amount $P_t$. After estimation is performed, the process returns to Step SB6, in which a storage cell is selected, and a power distribution amount is set.

Step SB8 and Step SB9: A determined power distribution amount is output to each storage cell unit 30 as an operation command. When a predetermined time elapses, the process returns to Step SB1.

As described above, it is possible to suppress capacity degradation of a storage cell while performing power adjustment. Therefore, it is possible to satisfy a request relating to the product lifetime of the storage cell 32, and to use the storage cell 32 as a distributed power source for power adjustment.

Further, the aforementioned storage cell control method is suitable for a case where a charge/discharge cycle is set every several seconds to every several tens of minutes. A great advantageous effect is obtained in performing frequency adjustment when a frequency is deviated from a specified value on a power system side, for instance.

Fourth Exemplary Embodiment

Figure 8:
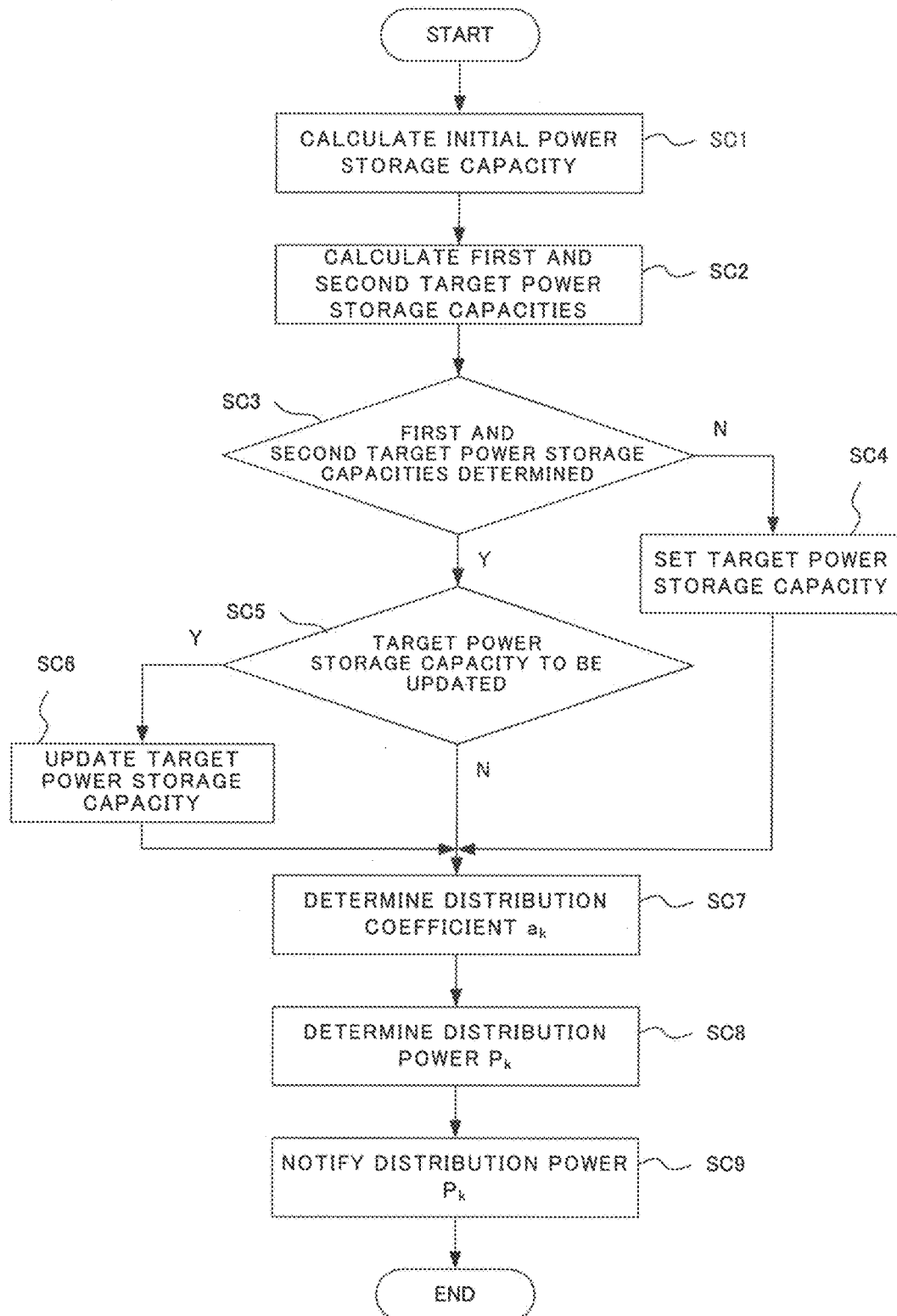
FIG. 8 is a flowchart illustrating a process of determining a power distribution amount to be applied to description of a fourth exemplary embodiment.

Next, the fourth exemplary embodiment is described. Note that the same constituent elements as those in the second exemplary embodiment are indicated with the same reference numerals, and description thereof is omitted as necessary. In the aforementioned exemplary embodiments, a target power storage capacity has one value. On the other hand, in the exemplary embodiment, storage cell control is performed by setting a plurality of target power storage capacities. FIG. 8 is a flowchart in performing control by setting two target power storage capacities i.e. a first target power storage capacity and a second target power storage capacity with respect to each storage cell unit 30.

Step SC1 and Step SC2: A power storage capacity calculator 23a of a determination unit 23 calculates a current power storage capacity $SOC_0$ based on storage cell information.

Further, a target power storage capacity setter 23c sets a power storage capacity capable of suppressing a capacity degradation speed as a first target power storage capacity $SOC_1$ based on capacity degradation speed correlation information. Further, the target power storage capacity setter 23c obtains a target power storage capacity after the power storage reaches the first target power storage capacity $SOC_1$ as a second target power storage capacity $SOC_2$.

The first target power storage capacity $SOC_1$ is set based on a relationship defined by the formula (11) to be described later. Specifically, the formula (11) is a capacity degradation amount minimization condition as well as the formula (4).

Further, the second target power storage capacity $SOC_2$ is a target power storage capacity to be set for the purpose of returning a storage cell to an initial state (a state at start of operation). The second target power storage capacity $SOC_2$ is set in such a manner that the state of charge approaches the initial state.

It is assumed that an initial power storage capacity $SOC_0$, a first target power storage capacity $SOC_{k1}$, and a second target power storage capacity $SOC_2$ of a storage cell 32 in a storage cell unit 30k are respectively $SOC_{k0}$, $SOC_{k1}$, and $SOC_{k2}$. In this case, the second target power storage capacity $SOC_{k2}$ is set to satisfy the formula (11):

$$f_k(t, SOC_{k1}) < f_k(t, SOC_{k2}) \leq f_k(t, SOC_{k0}) \tag{11}$$

As the first target power storage capacity $SOC_1$, for instance, it is possible to set a minimum value most approximate to the initial power storage capacity $SOC_0$. In a broad sense, as far as the sign of a primary differential component in a capacity degradation speed does not change in a range of from the initial power storage capacity $SOC_0$ to the first target power storage capacity $SOC_1$, a point at which an absolute value of the primary differential component is smallest is set as the first target power storage capacity $SOC_1$. This means that it is possible to use any of the storage cell unit 30 illustrated in FIG. 7A and the storage cell unit 30 illustrated in FIG. 7B.

In this example, it is not necessarily required to set a specific power storage capacity such as a minimum value of storage capacity as a target power storage capacity. A first target power storage capacity $SOC_1$ other than the above may be set depending on the initial power storage capacity $SOC_0$. For instance, a power storage capacity which is deviated from the initial power storage capacity $SOC_0$ by a predetermined fluctuation width $\Delta$ of power storage capacity may be set as a target power storage amount.

It is possible to set the second target power storage capacity $SOC_2$ as the initial power storage capacity $SOC_0$, for instance. Note that it is desirable to set the second target power storage capacity $SOC_2$ to be equal to or less than the initial power storage capacity $SOC_0$ in order to suppress capacity degradation. The second target power storage capacity $SOC_2$, however, is not necessarily limited to the above. In this example, it is assumed that the second target power storage capacity $SOC_2 \leq$ the initial power storage capacity $SOC_0$ in order to simplify the description.

In a process of performing charge/discharge based on a target power storage capacity as described above, a relationship defined by the formula (12) is always established regarding a capacity degradation speed of the storage cell 32:

$$f_k(t_k, SOC_k) = f_k(t_k, SOC_{k0}) \tag{12}$$

Therefore, in a case where a capacity degradation amount $D_k$ being a time integral value of the capacity degradation speed is held at the initial power storage capacity $SOC_0$, the capacity degradation amount $D_k$ is equal to or less than a capacity degradation amount $D_{k0}(t)$ as defined by the formula (13):

$$D_k(t) \leq D_{k0}(t) \tag{13}$$

Figure 9A:
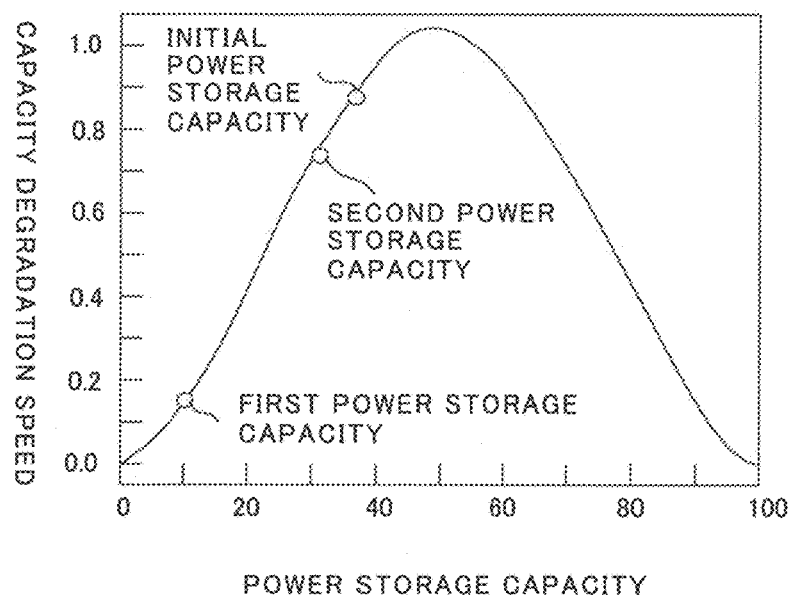
FIG. 9A is a diagram in a case where a capacity degradation speed decreases as a power storage capacity exemplifying a determined target power storage capacity decreases.
Figure 9B:
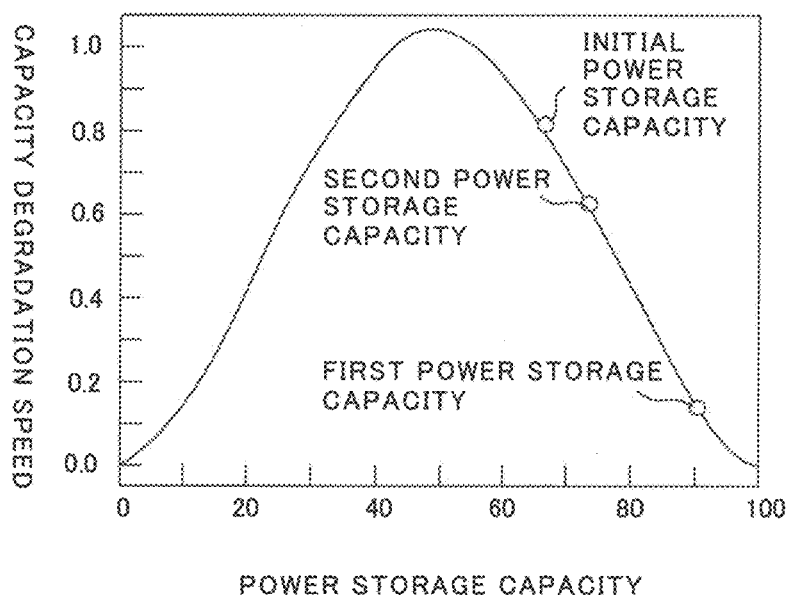
FIG. 9B is a diagram illustrating a case where a capacity degradation speed increases as a power storage capacity exemplifying a determined target power storage capacity decreases.

FIG. 9A and FIG. 9B are diagrams exemplifying a determined target power storage capacity. FIG. 9A is a diagram illustrating a case where a capacity degradation speed decreases as a power storage capacity decreases, and FIG. 9B is a diagram illustrating a case where a capacity degradation speed increases as a power storage capacity decreases.

Step SC3 to Step SC6: A target power storage capacity setter 23c judges whether or not a determined target power storage capacity (a first target power storage capacity and a second target power storage capacity) is set, and judges whether or not a determined target power storage capacity is updated. In a case where a determined target power storage capacity is set, the determined target power storage capacity is set in Step SC4. In a case where a determined target power storage capacity is updated, the determined target power storage capacity is updated in Step SC6.

Step SC7 to Step SC9: Subsequently, a power distributor 23d determines distribution of charge/discharge power with respect to each storage cell unit 30 in such a manner that the formulae (5) to (7) are established. For instance, it is proposed to control power distribution in such a manner that a storage cell 32 in a state that the capacity degradation speed is large is quickly shifted to a state that the capacity degradation speed is small, and to retain the storage cell 32 in a state that the capacity degradation speed is small for a long period of time.

In this case, for instance, there is proposed an example, in which a weighting amount is proportionally distributed with a magnitude of capacity degradation speed at a current power storage capacity in such a manner that a power distribution amount increases as a capacity degradation speed at a current power storage capacity increases, and a power distribution amount decreases as a capacity degradation speed decreases.

Further, for instance, it is possible not to distribute power in a case where a direction of change in the power storage capacity by charge/discharge according to an adjustment power amount is a direction opposite to a direction toward a target power storage capacity.

More specifically, it is possible to express a weighting factor $a_k$ of distribution to a storage cell unit $30k$ by the formula (14):

$$a_k = \begin{cases} v_k & (P_t \cdot (SOC_1 - SOC_k) \leq 0) \\ 0 & (P_t \cdot (SOC_1 - SOC_k) > 0) \end{cases} \tag{14}$$

In this example, the power storage capacity $SOC_k$ denotes a power storage capacity at a current time, and the power storage capacity $SOC_1$ denotes a target power storage capacity.

By performing a weighting process as described above, power distribution of a storage cell unit in a state that the capacity degradation speed is large increases, and the storage cell unit is quickly shifted to a state that the capacity degradation speed is small. Further, power distribution to a storage cell 32 in a state that the capacity degradation speed is small relatively decreases, and the storage cell 32 can be held in a state that the capacity degradation speed is small for a long period of time.

Note that in the aforementioned example, it is assumed that the weighting factor $a_k$ is proportional to a magnitude of capacity degradation speed in order to simplify the description. Actually, however, the weighting factor $a_k$ is not limited to a linear function of a capacity degradation speed, but may be a mathematical function such as a b-power function or an exponential function, in which a capacity degradation speed $V_k$, a current power storage capacity $SOC_k$, a target power storage capacity $SOC_i$ and a state i of a target power storage capacity are variables. Further, the weighting factor $a_k$ is not limited to a mathematical function, but may be a functional correlation with which weighting is determined with respect to an input variable.

A correlation with which weighting is determined with respect to an input variable may be represented by a table illustrating a correlation between a current power storage capacity, a target power storage capacity, and a weighting amount of power distribution amount, which are determined in advance based on a capacity degradation speed.

Distribution is performed with respect to any of the aforementioned power storage capacities in the same manner as described above. Alternatively, however, it is possible not to distribute charge/discharge power in a specific power storage capacity condition. For instance, in a case where a difference between an initial power storage capacity and a target power storage capacity is smaller than a set threshold value, it is possible not to distribute charge/discharge power. This may possibly achieve an advantageous effect of eliminating a possibility that capacity degradation may be accelerated by a change in the power storage capacity due to charge/discharge in a case where an initial power storage capacity lies in the proximity of a minimum value, for instance. Note that the threshold value is not limited to a fixed value, but may vary depending on a power storage capacity, a charge/discharge log, or a progress status of capacity degradation.

As described above, it is possible to suppress capacity degradation of the storage cell 32 while performing power adjustment. Therefore, it is possible to satisfy a request relating to the product lifetime of the storage cell 32, and to use the storage cell 32 as a distributed power source for power adjustment.

Example 1

Next, there is described an example, in a case where the aforementioned control method is applied to a storage cell 32 constituted by a lithium ion battery cell using manganese spinel on a cathode side and a carbon material on an anode side.

In this example, the storage cell 32 constituted by a single cell of 33 Ah, a BMU, and other constituent elements were configured on a personal computer. Further, there were used a storage cell unit A, a storage cell unit B, and a storage cell unit C, in which initial power storage capacities before power adjustment of the storage cell 32 were 20%, 50%, and 70%. Power consumption reduction such that a power adjustment request from a power system 4 was 60 W (which means reduction of a load of the power system 4, and means discharge of the storage cell 32) was performed for twenty minutes.

A current power storage capacity of the storage cell 32 in each storage cell unit 30 was calculated in the aforementioned condition. Next, calculated was a degradation speed difference between a current power storage capacity, and a power storage capacity in a direction of reducing power consumption (discharging the storage cell 32) with use of a capacity degradation speed correlation. The following Table 1 illustrates a result of the calculation.

TABLE 1

| Example 1 | Storage cell unit A | Storage cell unit B | Storage cell unit C |
|---|---|---|---|
| Amount of change | −0.10 | −0.05 | 0.10 |

From Table 1, it is clear that a capacity degradation speed decreases from a current value (the amount of change has a minus sign) in a case of the storage cell unit A whose power storage capacity is 20%, and a case of the storage cell unit B whose power storage capacity is 50%. Therefore, the storage cell unit C was eliminated from units to be controlled, and the storage cell units A and B were set as units to be controlled.

Further, the storage cell unit 30B whose absolute value of capacity degradation speed was larger than the storage cell unit 30A was set to have a high priority. In this case, a target power storage capacity was set in such a manner that the storage cell unit 30B was discharged at 50 W power for twenty minutes. Further, the remaining necessary power amount i.e. 10 W was distributed to the storage cell unit 30A.

As a comparative example, a discharge operation was performed by setting a target power storage capacity in such a manner that all the storage cell units 30 were equally discharged at 40 W for twenty minutes.

Comparison was made regarding capacity degradation amounts of the three cells after the same operation was repeated in Example 1 and the comparative example for one week (assuming that the cells were operated for one month). As a result of the comparison, 0.6% improvement with respect to an initial power storage capacity was obtained in Example 1. Further, a capacity degradation amount in a long-term operation was estimated by a simple addition calculation. As a result of the estimation, it is clear that capacity degradation suppressing effects of 6% per year, and 30% in five years operation are obtained.

Thus, it was confirmed that the storage cell control system 2 according to the exemplary embodiment can perform power adjustment while suppressing lifetime capacity degradation.

Example 2

Next, verification was performed regarding an advantageous effect in a case where a power amount was adjusted at a fixed cycle in a configuration of a storage cell control system 2 having the same specifications as those used in Example 1. In this example, it was assumed that a power adjustment request from a power system 4 was cyclically charging/discharging at 90 W for twenty minutes.

A current power storage capacity of a storage cell 32 in each storage cell unit was calculated in the aforementioned condition. Next, comparison was made regarding a degradation speed difference between a capacity degradation speed at a current power storage capacity, and an average value of capacity degradation speeds at power storage capacities larger and smaller than the current power storage capacity by 10%, with use of a capacity degradation speed correlation stored in advance in a personal computer. The following Table 2 illustrates a result of the comparison.

TABLE 2

| Example 2 | Storage cell unit A | Storage cell unit B | Storage cell unit C |
|---|---|---|---|
| V (current power storage capacity) − V (average power storage capacity) | −0.03 | 0.013 | 0.010 |

As illustrated in Table 2, a degradation speed difference was in the order of a storage cell unit 30A<a storage cell unit 30C<a storage cell unit 30B. In view of the above, power distribution was performed between the storage cell unit 30A and the storage cell unit 30C. In this example, a target power storage capacity was set by equally allocating power to each cell to facilitate control.

Further, as a comparative example, there was also examined a case where a target power storage capacity was set in such a manner that all the storage cell units 30 cyclically performed charge/discharge equally at 30 W for twenty minutes.

Comparison was made regarding capacity degradation amounts of storage cells 32 in the three storage cell units 30 after the same operation was repeated in Example 2 and the comparative example for one week. As a result of the comparison, 0.2% improvement with respect to an initial power storage capacity was obtained in Example 2.

Note that in a case where the storage cell unit 30B whose degradation speed difference on an average value was largest, and the storage cell unit 30A were combined, and the storage cell unit 30B and the storage cell unit 30C were combined, capacity degradation was higher in the combination examples, as compared with the comparative example.

Thus, it is clear that the storage cell control system according to the exemplary embodiment provides advantageous effects of suppressing lifetime capacity degradation such that capacity degradation per year is 2.4%, and capacity degradation in five years operation is 12% by a simple addition calculation.

Thus, it was confirmed that the storage cell control system according to the exemplary embodiment can perform power adjustment while suppressing lifetime capacity degradation.

Note that it is possible to record the storage cell control method in an information recording medium as a program so that a computer can read the program.

As above, the present invention has been described based on the exemplary embodiments. An exemplary embodiment is just an illustration, and various kinds of changes, addition or subtraction and combinations may be added to each of the above-mentioned exemplary embodiments unless it deviates from the main points of the present invention. It is understood by a person skilled in the art that modification made by adding such changes, addition/subtraction and combinations are also included in the scope of the present invention.

This application claims the priority based on Japanese Patent Application No. 2015-005741 filed on Jan. 15, 2015, the entire disclosure of which is hereby incorporated.

REFERENCE SIGNS LIST

2 Storage cell control system
4 Power system
8 Power line

10 Energy management unit (EMU)
20 Management unit
20 Power storage capacity
21 Communication unit
22 Storage unit
23 Determination unit
23a Power storage capacity calculator
23b Capacity degradation speed calculator
23c Target power storage capacity setter
23d Power distributor
24 Control unit
30 (30a to 30n) Storage cell unit
31 Communication unit
32 Storage cell
33 Inverter
34 Battery management unit (BMU)
35 State detection unit

The invention claimed is:

1. A storage cell control system configured to perform charge/discharge control for a plurality of storage cells under control based on a power adjustment request from a power system, the storage cell control system comprising:
    a power storage capacity calculating unit configured to calculate a current power storage capacity of the storage cell based on storage cell information of the storage cell;
    a target power storage capacity setting unit configured to set a target power storage capacity in stopping an operation of the storage cell;
    a capacity degradation speed calculating unit configured to calculate a current capacity degradation speed and a target capacity degradation speed with respect to each power storage capacity by applying the current power storage capacity and the target power storage capacity to capacity degradation speed correlation information set in advance; and
    a power distributing unit configured to distribute power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ is a time integral value of a capacity degradation speed in a case where the capacity degradation speed is fixed regardless of a power storage capacity, a capacity degradation amount minimization condition: a capacity degradation amount $D_{SOCvaried}(t) \leq$ a capacity degradation amount $D_{SOCfixed}(t)$ is satisfied.

2. The storage cell control system according to claim 1, wherein
    the power distributing unit distributes power in an ascending order of the target capacity degradation speed.

3. The storage cell control system according to claim 1, wherein
    the power distributing unit distributes power from a storage cell, whose capacity degradation speed is smaller than an average capacity degradation speed being an average value between an upper limit capacity degradation speed and a lower limit capacity degradation speed associated with an upper limit power storage capacity and a lower limit power storage capacity in cyclically operating the storage cell between the upper limit power storage capacity and the lower limit power storage capacity by repeating charge and discharge of the storage cell.

4. The storage cell control system according to claim 1, wherein
    the power distributing unit distributes power by standardizing a weighting factor to be given by a weighting function to a power adjustment amount requested from the power system, and performing a weighting process, the weighting function being such that the current power storage capacity of the storage cell, and the capacity degradation speed at the power storage capacity are variables.

5. The storage cell control system according to claim 1, wherein
    the target power storage capacity setting unit sets, as the target power storage capacity, a first target power storage capacity that satisfies the capacity degradation amount minimization condition, and a second target power storage capacity being a target power storage capacity after the target power storage capacity reaches the first target power storage capacity, and the second target power storage capacity is smaller than that at the capacity degradation speed at start of operation, and is larger than that at the capacity degradation speed of the first target power storage capacity.

6. The storage cell control system according to claim 1, wherein
    the storage cell is a lithium ion battery.

7. A storage cell control method for performing charge/discharge control for a plurality of storage cells under control based on a power adjustment request from a power system, the storage cell control method comprising:
    calculating a current power storage capacity of the storage cell based on storage cell information of the storage cell;
    setting a target power storage capacity in stopping an operation of the storage cell;
    calculating a current capacity degradation speed and a target capacity degradation speed with respect to each power storage capacity by applying the current power storage capacity and the target power storage capacity to capacity degradation speed correlation information set in advance; and
    by a power distributing unit, distributing power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ is a time integral value of a capacity degradation speed in a case where the capacity degradation speed is fixed regardless of a power storage capacity, a capacity degradation amount minimization condition: a capacity degradation amount $D_{SOCvaried}(t) \leq$ a capacity degradation amount $D_{SOCfixed}(t)$ is satisfied.

8. The storage cell control method according to claim 7, wherein
    power is distributed in an ascending order of the target capacity degradation speed.

9. The storage cell control method according to claim 7, wherein
    power is distributed from a storage cell, whose capacity degradation speed is smaller than an average capacity degradation speed being an average value between an upper limit capacity degradation speed and a lower limit capacity degradation speed associated with an upper limit power storage capacity and a lower limit power storage capacity in cyclically operating the storage cell between the upper limit power storage capacity and the lower limit power storage capacity by repeating charge and discharge of the storage cell.

10. The storage cell control method according to claim 7, wherein
power is distributed by standardizing a weighting factor to be given by a weighting function to a power adjustment amount requested from the power system, and performing a weighting process, the weighting function being such that the current power storage capacity of the storage cell, and the capacity degradation speed at the power storage capacity are variables.

11. The storage cell control method according to claim 7, wherein
the target power storage capacity includes a first target power storage capacity which satisfies the capacity degradation amount minimization condition, and a second target power storage capacity being a target power storage capacity after the target power storage capacity reaches the first target power storage capacity, and the second target power storage capacity is smaller than that at the capacity degradation speed at start of operation, and is larger than that at the capacity degradation speed of the first target power storage capacity.

12. A non-transitory recording medium storing a storage cell control program which causes a computer to execute charge/discharge control for a plurality of storage cells under control based on a power adjustment request from a power system, the storage cell control program comprising:
a step of calculating a current power storage capacity of the storage cell based on storage cell information of the storage cell;
a step of setting a target power storage capacity in stopping an operation of the storage cell;
a step of calculating a current capacity degradation speed and a target capacity degradation speed with respect to each power storage capacity by applying the current power storage capacity and the target power storage capacity to capacity degradation speed correlation information set in advance; and
a step of distributing power to the plurality of storage cells in such a manner that when it is assumed that t is an elapsed time from start of operation, a capacity degradation amount $D_{SOCvaried}(t)$ is a time integral value of a capacity degradation speed in a case where the capacity degradation speed varies according to a power storage capacity, and a capacity degradation amount $D_{SOCfixed}(t)$ is a time integral value of a capacity degradation speed in a case where the capacity degradation speed is fixed regardless of a power storage capacity, a capacity degradation amount minimization condition: a capacity degradation amount $D_{SOCvaried}(t) \leq$ a capacity degradation amount $D_{SOCfixed}(t)$ is satisfied.

13. The recording medium according to claim 12, wherein the storage cell control program further includes a step of distributing power in an ascending order of the target capacity degradation speed.

14. The recording medium according to claim 12, wherein the storage cell control program further includes a step of distributing power from a storage cell, whose capacity degradation speed is smaller than an average capacity degradation speed being an average value between an upper limit capacity degradation speed and a lower limit capacity degradation speed associated with an upper limit power storage capacity and a lower limit power storage capacity in cyclically operating the storage cell between the upper limit power storage capacity and the lower limit power storage capacity by repeating charge and discharge of the storage cell.

15. The recording medium according to claim 12, wherein the storage cell control program further includes a step of distributing power by standardizing a weighting factor to be given by a weighting function to a power adjustment amount requested from the power system, and performing a weighting process, the weighting function being such that the current power storage capacity of the storage cell, and the capacity degradation speed at the power storage capacity are variables.

16. The recording medium according to claim 12, wherein with respect to the storage cell control program,
the target power storage capacity includes a first target power storage capacity which satisfies the capacity degradation amount minimization condition, and a second target power storage capacity being a target power storage capacity after the target power storage capacity reaches the first target power storage capacity, and the second target power storage capacity is smaller than that at the capacity degradation speed at start of operation, and is larger than that at the capacity degradation speed of the first target power storage capacity.

* * * * *